United States Patent [19]
Forbord et al.

[11] Patent Number: 5,909,342
[45] Date of Patent: Jun. 1, 1999

[54] PLANAR FLEXIBLE CIRCUIT PACKAGE FOR COUPLING TRANSDUCERS WITH CARRIAGE MOUNTED CIRCUITRY

[75] Inventors: Kent J. Forbord, St. Louis Park; Kevin J. Schulz, Apple Valley; Kenneth R. Fastner, Inver Grove Heights; John S. Putnam, Excelsior, all of Minn.

[73] Assignee: Seagate Technology, Inc., Scotts Valley, Calif.

[21] Appl. No.: 08/802,869

[22] Filed: Feb. 19, 1997

Related U.S. Application Data

[60] Provisional application No. 60/011,879, Feb. 20, 1996, abandoned.

[51] Int. Cl.⁶ .................................................. G11B 5/55
[52] U.S. Cl. ............................................................ 360/106
[58] Field of Search .................................. 360/106, 104, 360/97.01

[56] References Cited

U.S. PATENT DOCUMENTS

| | | |
|---|---|---|
| 5,012,368 | 4/1991 | Bosier et al. . |
| 5,050,026 | 9/1991 | Goss . |
| 5,055,969 | 10/1991 | Putnam . |
| 5,161,074 | 11/1992 | Forbord et al. . |
| 5,276,572 | 1/1994 | Kinoshita et al. . |
| 5,422,764 | 6/1995 | McIlvanie ................................ 360/106 |
| 5,644,448 | 7/1997 | Suzuki .................................... 360/106 |

*Primary Examiner*—Robert S. Tupper
*Attorney, Agent, or Firm*—Frederick W. Niebuhr

[57] ABSTRACT

A rotary actuator for disk drives includes a carriage rotatable on a vertical axis, and multiple transducing head suspensions extended horizontally away from the carriage in cantilever fashion. Data reading and writing circuitry includes an electrical circuit package mounted at the carriage, and multiple flexible printed circuits extending horizontally away from the circuit package, each for electrical coupling to one of the transducing heads. A series of slots, formed through the circuit package along one edge, support the flexible printed circuits to achieve an electrical and mechanical coupling that orients the flexible printed circuits with their major planes horizontal throughout their respective lengths, avoiding any twists of the flexible circuitry while providing improved damping and electrical performance. Alternative connecting structures, in lieu of the slots, include rigid rails on one or both sides of each flexible printed circuit, and bendable tabs incorporated into the printed circuits.

24 Claims, 6 Drawing Sheets

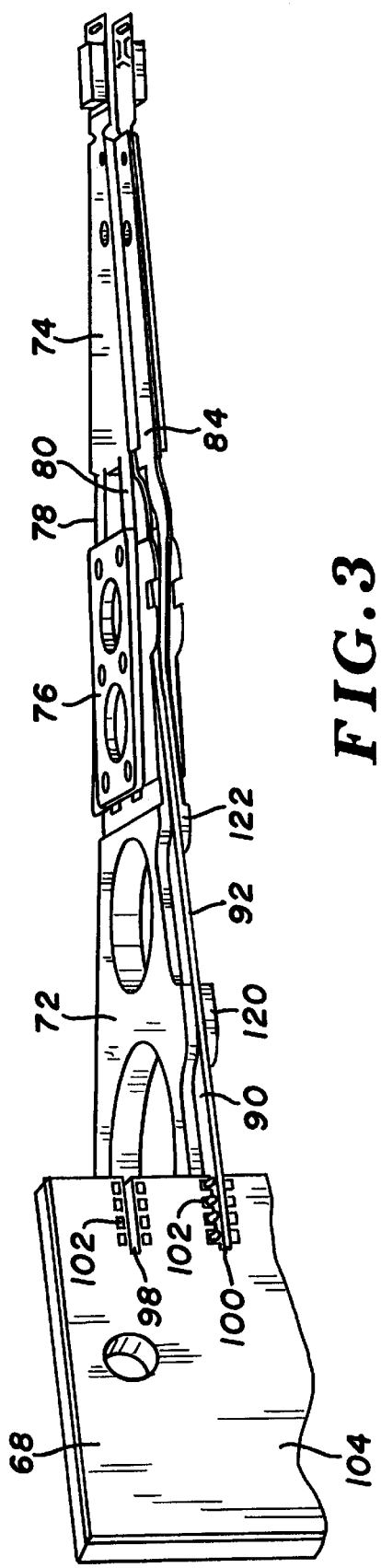
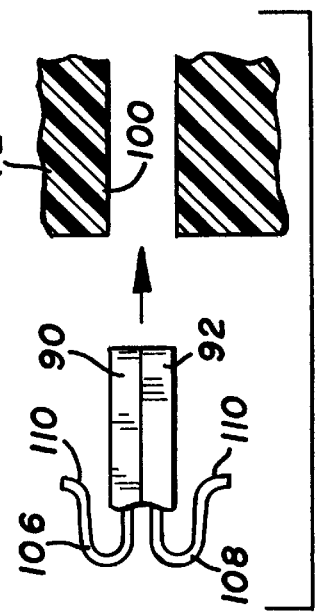
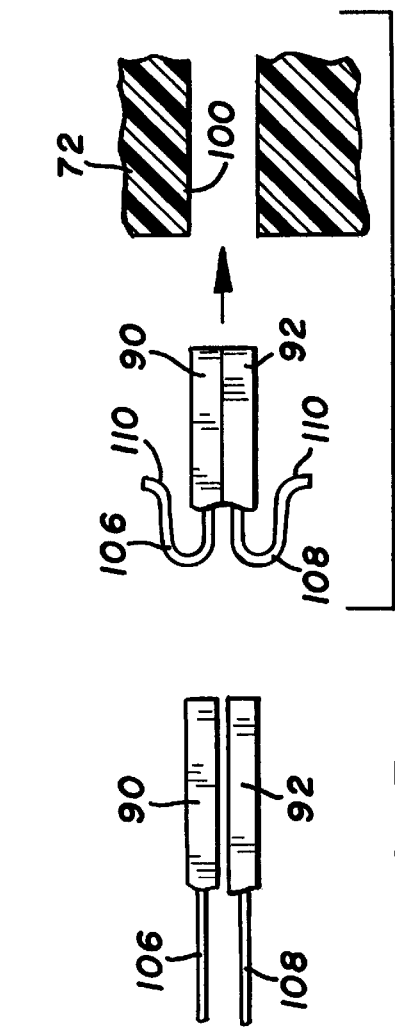
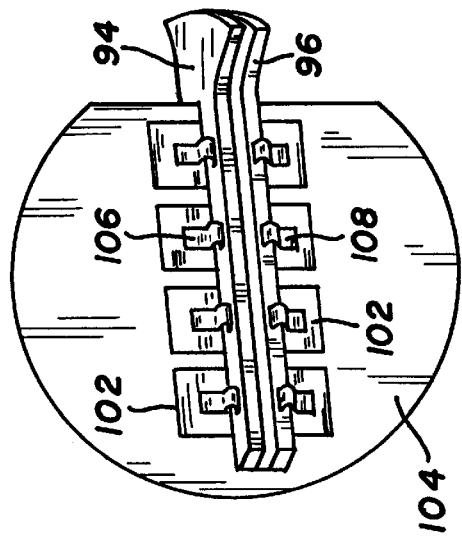
FIG. 3
FIG. 5a
FIG. 5b
FIG. 4

PLANAR FLEXIBLE CIRCUIT PACKAGE FOR COUPLING TRANSDUCERS WITH CARRIAGE MOUNTED CIRCUITRY

This application claims the benefit of Provisional Application No. 60/011,879 entitled "Parallel Flex on Suspension (FOS) Routing Scheme with 90 Degree Matrix Board Termination", filed Feb. 20, 1996.

BACKGROUND OF THE INVENTION

The present invention relates to magnetic disk drive data storage devices, and more particularly to the circuitry used to transmit signals to and from the magnetic data transducers used in such devices.

Designers of computer data storage products continually seek to improve disk drive performance, in terms of more rapid data transmission, increased reliability, and better use of the limited physical space available for the data storage media, data transducing heads and other components. These considerations arise in connection with the electrical circuitry that interacts with the transducing heads and their support and positioning structure. Such circuitry transmits essential data recording, reading and erasure signals to and from the transducers.

This circuitry can take a variety of forms. For example, U.S. Pat. No. 5,012,368 (Bosier et al) discloses multiple leads in the form of wires, extending along one side of a transducer support arm from a lead clip to the transducers. In U.S. Pat. No. 5,276,572 (Kinoshita et al), a flexible printed circuit extends along one side of a stack of transducer support arms towards the magnetic heads supported by the arms. Wires couple individual heads with the flexible printed circuit.

U.S. Pat. No. 5,055,969 (Putnam), assigned to the assignee of this application, discloses a multi-layer flexible circuit, a portion of which is mounted to the transducer support arm parallel to the arm, incorporating a data preamplifier 40 and a servo pre-amplifier 42. The circuit further includes a tail portion 32 perpendicular to the arm, requiring EL 90 degree turn or twist in the tail portion.

While these approaches are satisfactory in certain circumstances, present day actuator arrangements featuring thinner, lighter weight planar suspensions for supporting transducers, and frequently involve stacked arrangements of multiple suspensions, and thus raise several needs that remain unmet by presently used circuitry and circuitry support arrangements.

Therefore, it is an object of the present invention to provide a flexible circuit mounted along a transducer suspension that provides improved reliability, simpler installation and better damping characteristics.

Another object is to provide, in connection with actuators incorporating several data transducing heads, several flexible circuit packages associated individually with different transducing heads and mounted in a side-by-side arrangement that improves impedance matching among the circuit packages.

A further object is to provide an improved structure for electrically and mechanically coupling a rigid circuit and flexible printed circuits that extend from the rigid circuit to data transducing heads, to facilitate a space-saving planar orientation of the flexible printed circuits.

Yet another object is to provide an actuator with multiple transducer suspensions in a parallel, stacked arrangement, in which multiple flexible printed circuits are mounted with their major planes parallel to the major planes of the suspensions, to reduce the physical space requirements for the actuator and improve actuator performance.

SUMMARY OF THE INVENTION

To achieve these and other objects, there is provided an actuator for selectively positioning a data transducing head with respect to a data storage medium in a disk drive. The actuator includes a carriage mounted for movement relative to a stationary disk drive frame, such that a given point on the carriage travels substantially within a predetermined plane. The actuator has a transducer support assembly that includes at least one elongate transducer suspension means, mounted to the carriage and extended away from the carriage in cantilever fashion with a major plane of the suspension means substantially parallel to the predetermined plane. At least one magnetic data transducing head is supported at a free end region of the transducer suspension means. An electrical circuit package, integral with the carriage, is composed of a substantially rigid dielectric substrate and an electrical circuit supported by the dielectric substrate. The electrical circuit includes a plurality of electrical contacts exposed at an exterior surface of the circuit package. The exterior surface is offset angularly with respect to the predetermined plane. The actuator further incorporates flexible electrical circuitry including an elongate and substantially planar flexible printed circuit extending along the suspension from the circuit package to the transducing head for establishing an electrical coupling with the transducing head. A connecting structure is provided for forming a mechanical and electrical coupling of the flexible printed circuit with the circuit package at the exterior surface, while at the same time selectively orienting the flexible printed circuit such that a major plane of the flexible printed circuit is substantially parallel to the predetermined plane.

The flexible printed circuit is typical of its type in that it has a length and width that far exceed its thickness, i.e. by a factor of 10 or more. The major plane, therefore, is the plane perpendicular to the thickness. Thus, the flexible printed circuit is easily flexed or bent about axes contained within the major plane, while resisting any bending about axes perpendicular to the major plane. Likewise, the transducer suspension means has a length and width that greatly exceed its thickness. Its major plane also is perpendicular to the thickness.

Because the respective major planes of the flexible printed circuit and the transducer suspension means are parallel, both are considerably more resistant to bending about axes perpendicular to the selected plane. The result is a closer correspondence in bending behavior between the transducer suspension and the flexible printed circuit, facilitating a more secure and reliable attachment of the printed circuit to the suspension and imparting improved damping characteristics to the printed circuit/suspension assembly. In contrast, a flexible printed circuit oriented perpendicular to the suspension, bonded to the suspension, would tend to impart an undesirable stiffness. A further advantage is a simpler, more reliable termination for effecting the necessary electrical coupling with the transducing head.

Typically the carriage is rotatable about an axis parallel to the predetermined plane, thus to move the transducing head in an arc parallel to that plane. The flexible printed circuit, oriented with its major plane in the plane of transducer suspension motion, resists the momentary deformations and dampens vibrations due to rapid accelerations and decelerations of the carriage. To further improve the printed circuit in this regard, a stiffening means can be formed in the printed circuit, preferably an additional metalized segment not needed to conduct signals but lending stiffness.

The connecting structure can take a variety of forms, including a slot in the circuit package to accommodate an edge-wise insertion of the flexible printed circuit; parallel rails or other structure that defines a groove adapted to accommodate such edgewise insertion; and one or more tabs formed as part of the printed circuit at a proximate end of the circuit, bendable to facilitate a surface engagement with the exterior surface of the circuit package while keeping the remainder of the flexible printed circuit in the desired orientation.

Frequently an actuator incorporates multiple transducer suspensions extending in parallel, spaced apart and stacked relation from a single carriage. Such an arrangement effectively multiplies the available data storage area in a given disk drive, but requires efficient use of limited space within the disk drive housing. The parallelism of the major planes of multiple transducer suspensions and associated flexible printed circuits, is particularly effective in keeping actuator heights to a minimum. In this environment the circuit package spans substantially the full height of the actuator, with multiple couplings of the flexible printed circuits formed with the circuit package. By properly orienting each of the printed circuits, the connecting structure ensures that the desired arrangement is achieved without any undesirable twisting of the flexible printed circuits. As a result, the actuator exhibits improved electrical performance, reduced cycle times and improved damping characteristics.

Thus in accordance with the present invention, a planar flexible printed circuit forms a more reliable and more repeatable electrical connection between a rigid circuit package supported by an actuator carriage, and a transducing head suspended with respect to the carriage. A unique coupling of each printed circuit with the circuit package establishes the desired planar flexible printed circuit orientation, even though the circuit package is oriented perpendicular to the planes of the flexible printed circuits. The result is a more easily assembled and more reliable connection between the transducing heads and circuit package, and improved actuator performance due to the parallel planar orientations of the transducer suspensions and associated printed circuits.

IN THE DRAWINGS

For a further understanding of the above and other features and advantages, reference is made to the following detailed description and to the drawings, in which:

FIG. 3 is an enlarged perspective view of one of the transducing head suspensions of the rotary actuator, with a portion of an electrical circuit package, illustrating a connection of a flexible printed circuit with the circuit package;

FIG. 4 is an enlarged perspective view of the connection;

FIGS. 5a and 5b are schematic views illustrating the formation of a connection;

DETAILED DESCRIPTION OF THE PREFERRED EMBODIMENT

Figure 1:
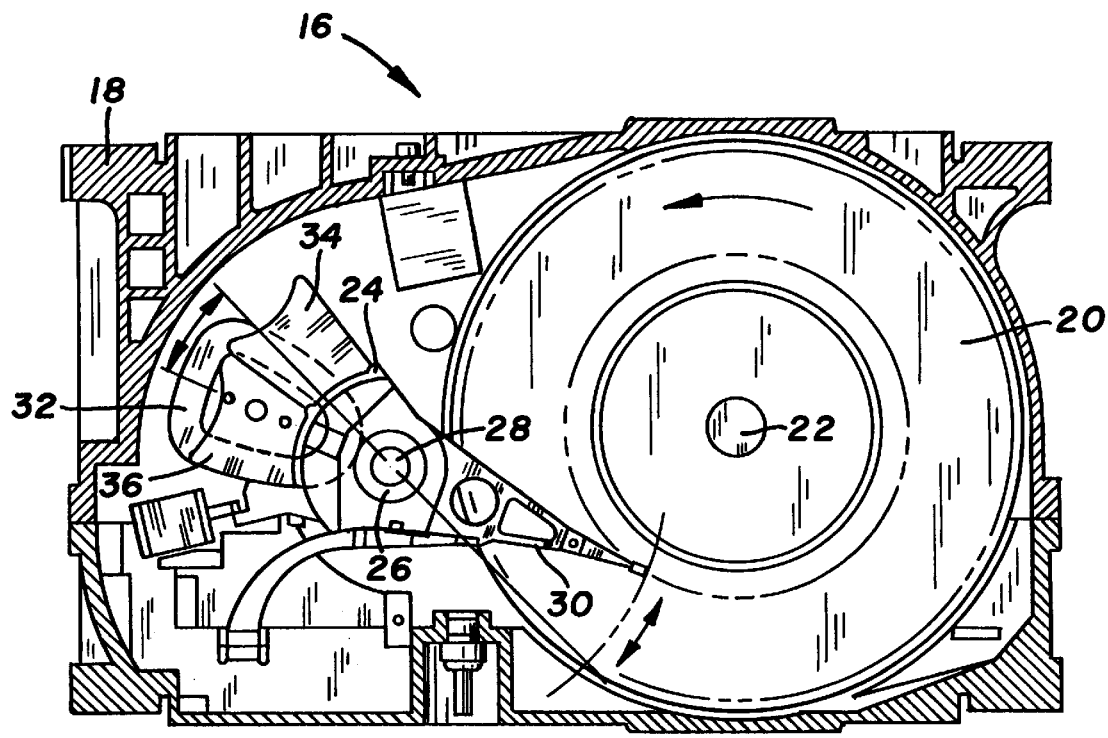
FIG. 1 is a schematic top plan view of a magnetic disk drive incorporating a rotary actuator constructed in accordance with the present invention.

Turning now to the drawings, there is shown in FIG. 1 a magnetic disk drive 16 including a deck 18 which is part of a stationary frame or housing for the disk drive. A stack of magnetic data storage disks, the top one being shown at 20, is mounted on a spindle 22 to rotate relative to the deck on a vertical axis. Also mounted on deck 18 is a rotary actuator 24 for controllably and variably positioning magnetic transducing heads relative to the disks, to record, read and erase magnetic data. Rotary actuator 24 includes a carriage 26 mounted on an actuator shaft 28 for pivoting on a vertical axis. A stack of multiple transducer suspensions, the top one being shown at 30, extend from the carriage radially of shaft 28. A magnetic transducing head is supported at the free end of each suspension, remote from the actuator shaft. An actuator coil 32 extends radially of the shaft opposite to the suspensions. Actuator coil 32 is formed of windings of electrically conductive wire, with current selectively introduced into the coil to form a magnetic field about the coil. The coil field interacts with the magnetic fields of stationary permanent magnets 34 and 36, to pivot the carriage and carry the transducing heads in arcuate paths relative to the magnetic disks. The rotary pivot axis is vertical and thus the arcs traversed by the transducing heads are within horizontal planes.

Figure 2:
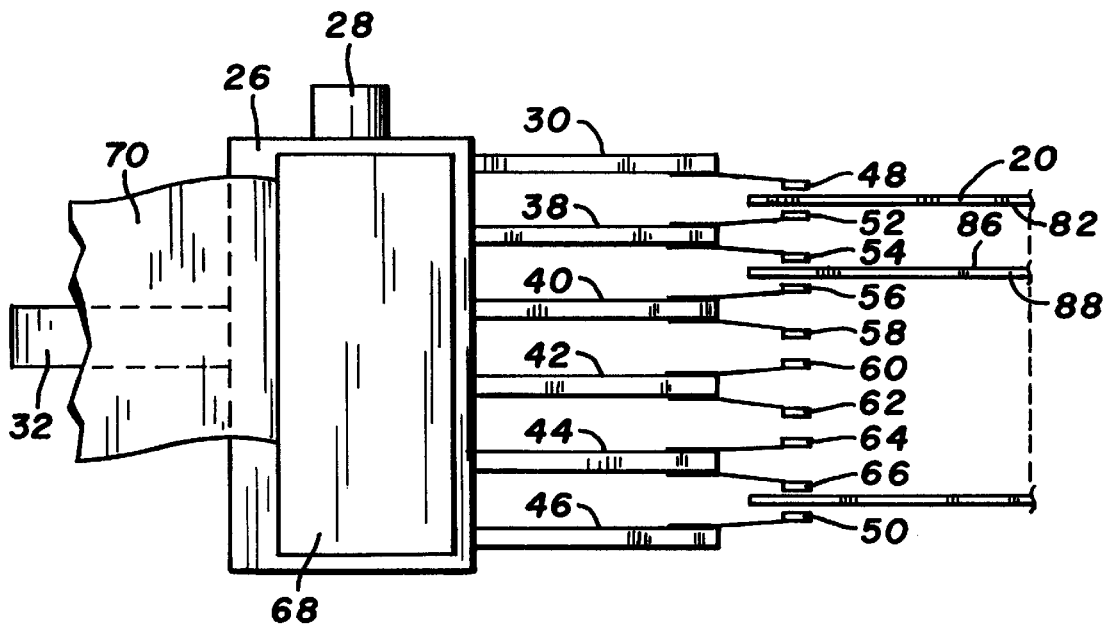
FIG. 2 is an enlarged elevational view of the rotary actuator.

FIG. 2 is an elevation of rotary actuator 24 apart from the disk drive. Several transducer suspensions extend horizontally from the carriage, as indicated at 30, 38, 40, 42, 44 and 46. Top and bottom suspensions 30 and 46 support single transducing heads, indicated respectively at 48 and 50. Intermediate suspensions 38, 40, 42 and 44 support respective pairs of transducers, as indicated at 52, 54, 56, 58, 60, 62, 64, and 66.

An electrical circuit package 68, including a substantially rigid substrate and an electrical circuit formed in and supported by the substrate, is mounted to the carriage and extends vertically to encompass the height of the carriage. A flexible electrical cable 70 associates the circuit package (a printed circuit board) with read and write control circuitry not shown.

FIG. 3 shows transducer suspension 38 in greater detail. The suspension includes a substantially rigid support arm 72 mounted to and extending horizontally from carriage 26 in cantilever fashion. At the free end of the support arm, a load arm 74 is mounted to the support arm through a base plate 76. Load beams 78 and 80 extending from the base plate are preloaded in a known manner, causing load arm 74 to bias transducing head 52 upwardly toward a data surface 82 of magnetic disk 20.

Similarly, a load arm 84 is mounted to support arm 72 through a base plate, with load beams that cause load arm 84 to bias transducer 54 downwardly toward a recording surface 86 of a magnetic disk 88.

Suspension 38 has a length (taken in the radial direction) considerably greater than its width, with the length and width in turn being much greater than a thickness dimension taken in the vertical direction. Thus a major plane of the suspension, which is the plane perpendicular to the thickness direction, is horizontal. The suspension, particularly at beams 78 and 80 and the corresponding beams associated with load arm 84, is bendable about axes in the width direction. The suspension experiences no significant bending about vertical axes, i.e. axes normal to the major plane.

Two flexible printed circuits 90 and 92 extend lengthwise from circuit package 68 to transducing heads 52 and 54, respectively. Printed circuits 90 and 92 are arranged side by side along one edge of support arm 72 and continue away from carriage 26 between the load arms, with printed circuit 90 bonded to load arm 74 and printed circuit 92 bonded to load arm 84. Then they proceed to their respective electrical connections with transducers 52 and 54. As perhaps best seen in FIG. 9, flexible printed circuits 90 and 92 have length dimensions greater than their width dimensions, which in turn are greater than their thickness dimensions at least by a factor of ten, whereby the major plane of each printed circuit is horizontal, i.e. parallel to the major plane of the suspension. More particularly, each flexible printed circuit has a length on the order of several inches, a maximum width at most about 1 inch, and a thickness on the order of about 5/1000 of an inch. Accordingly, each of the flexible printed circuits is easily bent or flexed about axes within its major plane (especially axes parallel to the width), but is highly resistant to bending about vertical axes, i.e. axes perpendicular to the major plane.

Thus, suspension 38 and flexible printed circuits 90 and 92 are somewhat similar in terms of the relationship of length and width to thickness, and the resulting bending tendencies. This enhances the utility of printed circuits 90 and 92 in damping unwanted vibrations in suspension 38, caused by rapid accelerations and decelerations of carriage 26. At the same time, the printed circuits do not produce undesirable stiffness to counteract the bending of the load arm needed to momentarily adjust transducing head position.

The favorable damping and flexing characteristics of flexible printed circuits 90 and 92 are realized by ensuring that each of these circuits over its full length is in the desired orientation, i.e. with its major plane horizontal. Accordingly, respective proximate ends 94 and 96 of printed circuits 90 and 92 are connected to circuit package 68 in a manner that maintains that orientation. More particularly, a series or slots through circuit package 68, two of which are shown at 98 and 100, provide a connecting structure for establishing the necessary electrical and mechanical coupling of the circuit package and flexible printed circuits. Slot 98 is shown unoccupied, with two rows of contact pads 102 arranged above and below the slot. Pads 102 are exposed at an outer surface 104 of the circuit package, but also can be exposed inside the slots although such additional exposure is not necessary.

FIG. 4 illustrates the connection of flexible printed circuits 90 and 92 in greater detail. Before their coupling to the circuit package, printed circuits 90 and 92 are selectively etched to expose respective sets of leads 106 and 108. The leads are bent to form lands 110. Then, when circuits 90 and 92 are inserted edgewise into slot 98, to the right as viewed in FIG. 5b, lands 110 are brought into contact with pads 102 and bonded to the pads by an ultrasonic, hot bar, softbeam or other suitable process. Slot 98 is formed with a width that preferably is about equal to or slightly larger than the combined thicknesses of flexible printed circuits 90 and 92, to produce a close fit or a somewhat tight surface engagement, for a reliable mechanical connection.

While connections in slot 98 and the remaining slots are not described, they are essentially similar. Likewise, suspensions 40, 42 and 44 are substantially the same as suspension 38, with top and bottom suspensions 30 and 46 likewise being similar, with the exception that each supports only one transducing head.

Figure 6:
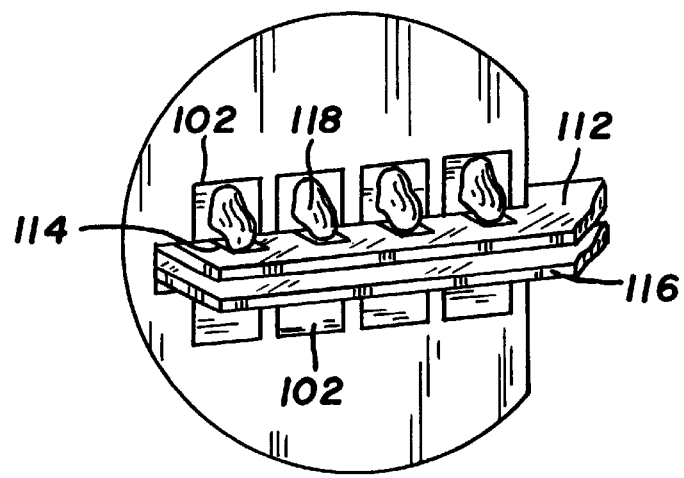
FIG. 6 is an enlarged view similar to that in FIG. 4, showing an alternative connection.

An alternative connection is shown in FIG. 6, in which a flexible printed circuit 112 is selectively etched to expose contacts in the form of pads 114 rather than leads, with a similar set of pads being formed in an adjacent flexible circuit 116. Once again, the flexible printed circuits are positioned side by side and inserted edgewise into slot 100 in this case a sufficient distance to align each of pads 114 with an associated pad 102 of the circuit package, so that each pair of adjacent pads forms a corner of about 90 degrees. The connection is completed by a series of soldered joints 118, each along the corner of a pair of pads 102 and 114. Similar joints, not seen in FIG. 6, secure flexible printed circuit 116.

The slots formed through circuit package 68 do not provide a "bottom" that limits edgewise insertion. Further, the slots can be formed of sufficient length so that the leftward ends of the flexible printed circuits (as viewed in FIG. 3) do not necessarily abut the slot edge. Consequently, although the spacing between adjacent leads 106 and adjacent pads 114 is required to match the spacing between pads 102, the depth of insertion (FIG. 5b) to achieve contact is not critical, nor is the amount of leftward insertion (FIG. 3).

Figure 7:
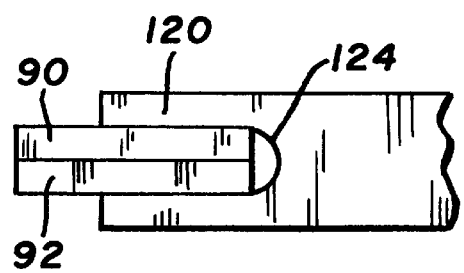
FIG. 7 is a sectional view showing two flexible printed circuits supported side by side along a support arm of the transducer suspension.

Thus, pairs of the flexible printed circuits are supported side by side in their associated slots. The printed circuits further are maintained side by side within grooves defined by opposed pairs of support arm extensions 120 and 122. FIG. 7 is a sectional view taken through extensions 120, showing a groove 124 and circuits 90 and 92 seated within the groove.

Figure 9:
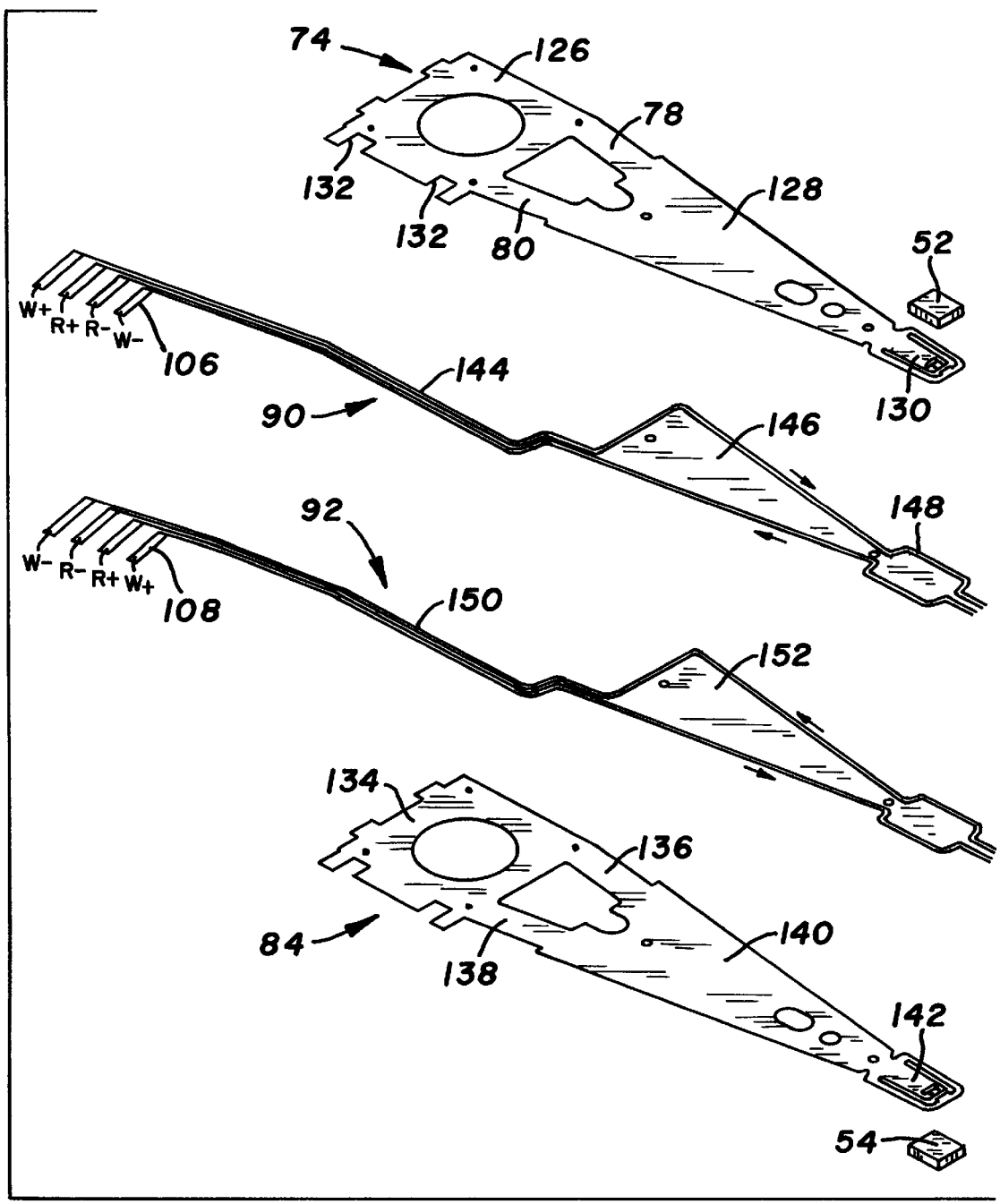
FIG. 9 is a perspective, exploded parts view of part of the suspension.

FIG. 9 shows upper and lower load arms 74 and 84, and flexible printed circuits 90 and 92, separate from one another but in the desired orientation, i.e. with their major planes horizontal. Upper load arm 74 includes a generally rectangular region 126 swaged or otherwise joined to support arm 72. Load beams 78 and 80 extend from the rectangular region and are controllably formed, i.e. bent to provide a selected preload. The load beams extend to a tapered region 128, at the end of which a gimbal 130. The gimbal supports transducing head 52 in a manner to allow momentary pivotal adjustments about pitch and roll axes. Rectangular region 126 includes cut-outs 132 and 134 adapted to receive and support flexible printed circuit 90 in the completed assembly.

Lower load arm 84 is similar to the upper load arm, having a rectangular region 134 secured to the lower surface of base plate 76, load beams 136 and 138, tapered region 140 are gimbal 142.

Flexible printed circuit 90 is of known laminar construction with a circuit layer formed between two electrically insulative layers. An adhesive layer is formed between each insulative layer and the circuit layer. The circuit layer is formed of copper or another suitable connector, while the insulative layers are formed of polyimide. At proximate end 94, flexible printed circuit 90 is etched or otherwise treated to provide four leads 106, labeled "W+", "W−", "R+" and "R−" to designate conductive paths for reading or writing data. These paths remain electrically isolated from one another as they proceed along a narrow medial region 144 of the flexible circuit. At a triangular region 146, two of the paths (W+ and R+) are directed away from the others to the opposite side of the flexible circuit and along the opposite edge of the triangular region. A remote end 148 of flexible circuit aligns with gimbal 130 in the completed assembly. The area between the circuit path pairs at end 148 is open. Triangular region 146, which between edges consists of the polyimide and adhesive layers, is bonded to tapered region 128 of the upper load arm.

Flexible printed circuit 92 is of similar construction, including leads 108 at its proximate end, a medial region 150 extended to a triangular region 152 which is bonded to lower load arm 84 at tapered region 140. The opposite pairs of circuit paths are shaped to provide a profile that corresponds to the profile of gimbal 142, and the remote ends of the circuit paths are electrically coupled to transducing head 54.

Figure 8:
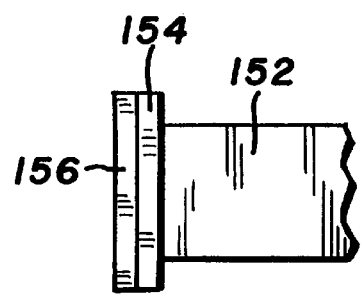
FIG. 8 is a similar sectional view of a support arm and flexible printed circuits.

As noted above, in the assembled suspension flexible printed circuits 90 and 92 are maintained side by side along one edge of the suspension, until the four conductive paths divide into pairs of paths on the opposite sides of the printed circuit. Over much of their length, medial regions 144 and 150 of the flexible printed circuits are contained within a groove 124 along one edge of support arm 72. FIG. 7 shows the flexible printed circuits seated in the groove. For comparison, FIG. 8 illustrates a support arm 152 and two flexible printed circuits 154 and 156 mounted along one edge of the arm. Printed circuit 154 is secured to the arm with an adhesive, and overlying flexible printed circuit 156 is secured to printed circuit 154.

FIGS. 7 and 8 can be compared for an appreciation of several advantages afforded by the parallel alignment of the flexible printed circuits and suspensions (as in FIG. 7). First, the flexing or bending behavior of each flexible printed circuit is more closely matched to the behavior of the suspension to which it is mounted. As seen from FIG. 7, both the flexible printed circuits and support arm (and more generally the suspension as a whole) have high stiffness in the horizontal direction, i.e. high resistance to bending about vertical axes. As a result, the flexible printed circuits lend beneficial stiffness in the horizontal direction for improved damping. Further, because of the absence of any substantial vertical stiffness, the flexible circuits do not interfere with the flexing of the suspension necessary for momentary positional adjustments of transducing heads 52 and 54.

In contrast, flexible printed circuits 154 and 156 have substantial stiffness in the vertical direction. They do not provide substantial rigidity in the horizontal direction. Thus, they are likely to provide less damping, and to resist momentary flexures of the suspension about horizontal axes, especially axes running left to right as viewed in FIG. 8.

Another advantage of the parallel orientation in FIG. 7 is a better matching of impedances in the flexible printed circuits, an increasingly important consideration at higher signal frequencies. Flexible circuits 90 and 92 are symmetrically arranged with respect to one another and to the surrounding material of the support arm. By contrast, flexible printed circuit 154 lies between circuit 156 and support arm 152, while circuit 156 borders only circuit 154. This asymmetrical arrangement does not result in the desired impedance match.

A further advantage of the arrangement in FIG. 7 is the ability to remove either flexible printed circuit 90 or flexible circuit 92 to inspect or repair it without disturbing the other circuit. Flexible printed circuit 154 cannot be removed without also removing flexible circuit 156.

A salient advantage, particularly in connection with stacked arrangements of suspensions and transducers, is that flexible circuits in parallel alignment have virtually no impact on the required height of the rotary actuator. When the flexible printed circuits are aligned parallel with the support arms and more generally the suspensions, they add virtually nothing to the thickness or vertical dimension. From FIG. 8, it is seen that the width of each flexible printed circuit adds considerably to the vertical dimension of the suspension. This problem becomes more pronounced as further conductive paths are added to the flexible printed circuit, for example due to preamplifiers or other components mounted to the load arm.

Figure 10:
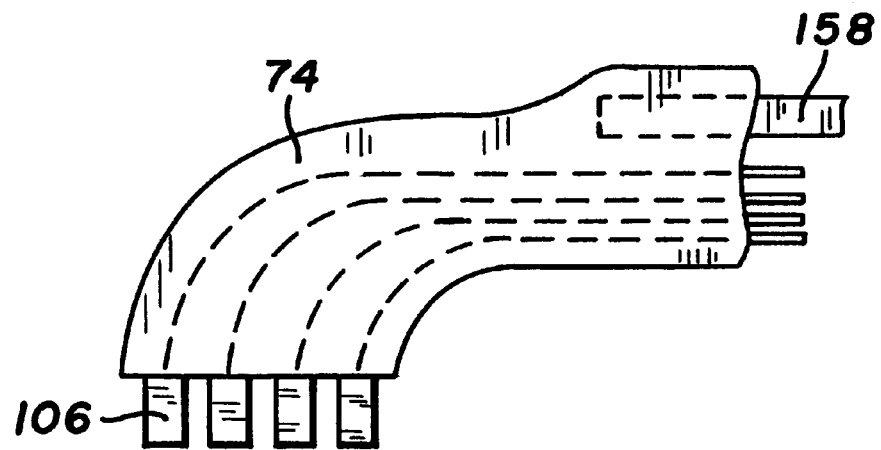
FIGS. 10 and 11 illustrate two alternative types of contacts at a proximate end of one of the flexible printed circuits.
Figure 11:
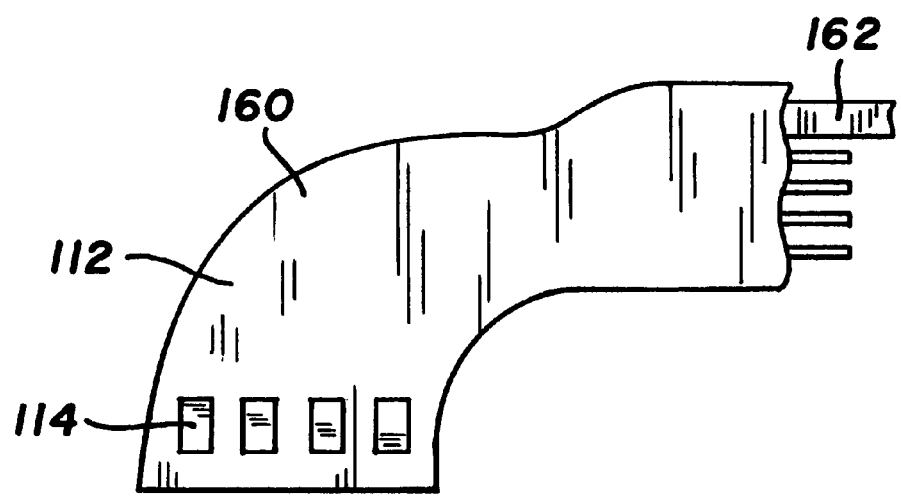

As noted above, the proximal ends of the flexible printed circuits can be provided either with extending leads or exposed pads, for connection with the pads of the circuit package. FIGS. 10 and 11 show these alternative arrangements in greater detail. To form a proximal region shown in FIG. 10, the polyimide and adhesive layers initially are formed to extend at least to the free ends of leads 106, then later are removed by etching to expose the leads to a predetermined length. A portion of medial region 144 is shown, to reveal an additional conductive region 158, which extends along the medial region parallel to the circuit paths. Region 158 is not used as a conductor, but rather as a stiffener to provide additional resistance to bending, especially about axes perpendicular to the major plane of flexible printed circuit 90.

FIG. 11 illustrates an alternative proximate end region 160 of a flexible printed circuit, showing conductive pads 114 rather than leads. This structure is formed first by completely encapsulating the conductive paths within opposite polyimide layers, then selectively etching to remove rectangular portions of the polyimide and adhesive layer to expose each conductive pad. Again, an auxiliary conductive region 162 is, provided for stiffness along the medial region of the flexible printed circuit.

Figure 12:
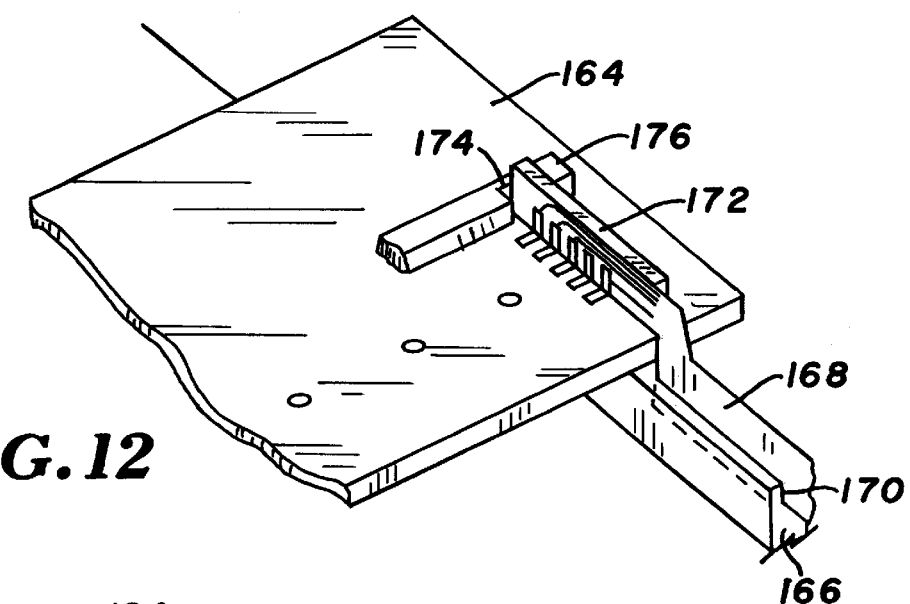
FIGS. 12, 13 and 14 illustrate alternative arrangements for coupling flexible printed circuits with a substantially rigid circuit package.
Figure 13:
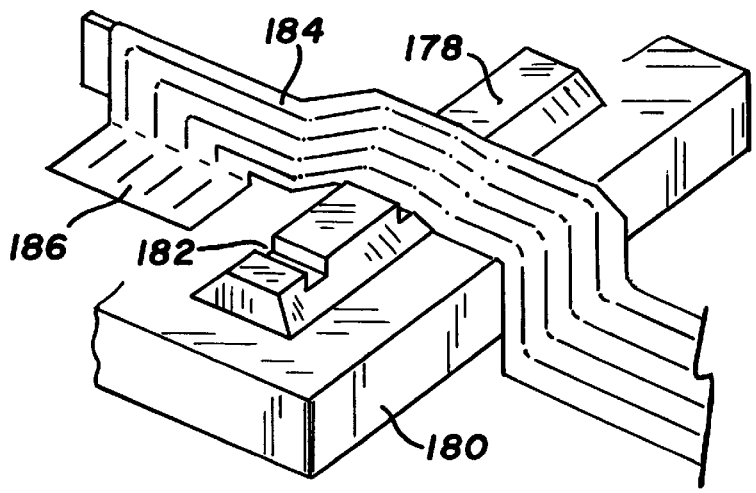
Figure 14:
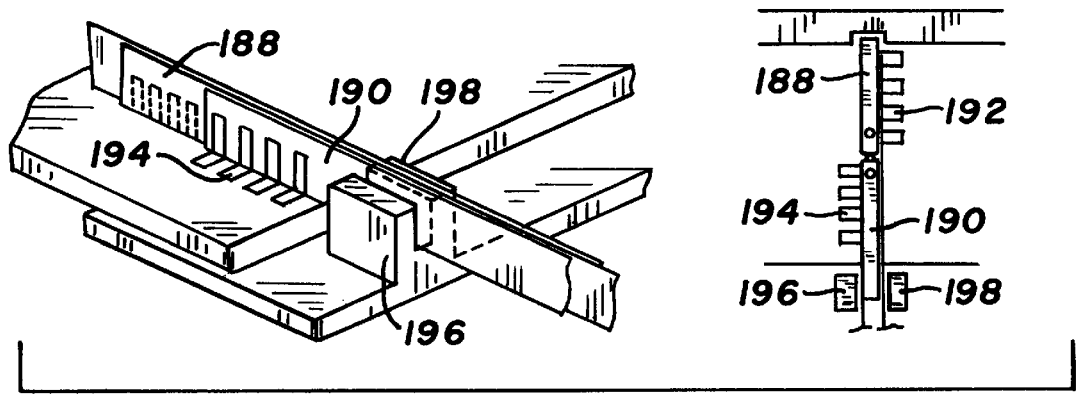

While slots in circuit package 68 effectively maintain the flexible printed circuits in the desired horizontal orientation, they add to the cost of fabricating the circuit package and require space that might otherwise be available for circuit paths. FIGS. 12–14 illustrate alternative connecting structures and features that do not require slots in the circuit package.

For example, FIG. 12 shows part of a circuit package 164, part of a support arm 166 to which the circuit package is mounted, and a flexible printed circuit 168 inserted edgewise into a groove 170 formed along the support arm. There is no slot in the circuit package. The portion of flexible circuit 168 adjacent the circuit package is supported by a rigid rail 172 and thus maintained with its major plane perpendicular to the circuit package. In turn, rail 172 is supported by insertion of its edge into a slot 174 within a support piece 176, and further may be supported by a peg inserted into the circuit package if desired.

FIG. 13 shows a support piece 178 mounted to a circuit package 180, with a plurality of slots 182 formed in piece 178 for supporting flexible printed circuits, one of which is shown at 184. Also shown is a tab portion 186, bent 90 degrees out of a planar alignment with the remainder of the flexible printed circuit. Contact pads exposed on the bottom side of tab portion 186 are connected to corresponding pads in the circuit package, with tab portion 186 coplanar with the circuit package and at the same time supporting the flexible printed circuit in a perpendicular orientation.

If desired, the features shown in FIGS. 12 and 13 can be mounted to or formed on an auxiliary substrate integral with the carriage, the carriage itself or the support arms, rather than directly on the circuit package.

FIG. 14 shows proximal end regions of flexible circuits 188 and 190 with respective sets of leads 192 and 194 extending in opposite directions, spaced apart from one another to stagger the sets of leads. Rails 196 and 198 support printed circuits 188 and 190 in the desired perpendicular orientation. Alternatively a single rail can support both flexible printed circuits. The offset or staggered arrangement of sets of leads permits a closer spacing of adjacent pairs of flexible printed circuits.

Thus in accordance with the present invention, flexible printed circuits are coupled to a relatively rigid circuit package on an actuator carriage and extend away from the carriage to provide electrical couplings to associated transducing heads supported by suspensions that also extend away from the carriage. The suspensions and flexible printed circuits are aligned with their major planes parallel to one another, for improved electrical performance especially at higher frequencies, better damping characteristics, and more efficient use of space, particularly in actuators having multiple stacked transducing head suspensions.

What is claimed is:

1. An actuator for selectively positioning a data transducing head with respect to a data storage medium in a disk drive, including:
   a carriage mounted for movement relative to a stationary disk drive frame, such that a given point on the carriage travels substantially within a predetermined plane;
   a transducer support assembly including at least one elongate transducer suspension structure mounted to the carriage and extended away from the carriage in cantilever fashion with a major plane thereof substantially parallel to the predetermined plane;
   at least one data transducing head supported at a free end region of the transducer suspension structure;
   an electrical circuit package integral with the carriage, composed of a substantially rigid dielectric substrate and a first electrical circuit supported by the dielectric substrate and including a plurality of electrical contacts exposed at an exterior surface of the circuit package;
   flexible electrical circuitry for electrically coupling the first electrical circuit and the transducing head, including an elongate and substantially planar flexible printed circuit extending lengthwise along the suspension structure from the circuit package toward the transducing head;
   wherein the flexible printed circuit has mutually perpendicular length, width and thickness dimensions, the length and width dimensions are greater than the thickness dimension at least by a factor of ten, and said major plane is perpendicular to the thickness;
   a connecting structure integral with the electrical circuit package for forming a mechanical and electrical coupling of the flexible ted circuit with the circuit package while selectively orienting the flexible printed circuit when in said coupling such that a major plane of the flexible circuit is substantially parallel to said predetermined plane; and
   a stiffening means incorporated in the flexible printed circuit to increase its resistance to bending about axes parallel to the thickness dimension, said flexible printed circuit being more resistant to bending about said axed parallel to the thickness dimension.

2. The actuator of claim 1 wherein:
   said exterior surface of the electrical circuit package is substantially planar and perpendicular to the predetermined plane.

3. The actuator of claim 1 wherein:
   said carriage is rotatable about an axis perpendicular to the predetermined plane and thereby moves the data transducing head in an arcuate path, and said exterior surface of the circuit package is normal to the predetermined plane.

4. The actuator of claim 1 wherein:
   said connecting structure includes a slot formed in the rigid electrical circuit package parallel to said predetermined plane and adapted to accommodate an edgewise insertion of the flexible printed circuit and to support the flexible printed circuit once so inserted.

5. The actuator of claim 1 wherein:
   said connecting structure includes a support feature positioned selectively with respect to the circuit package and defining a groove, said groove adapted to accommodate an edgewise insertion of the flexible printed circuit and a nesting engagement of the flexible printed circuit within the groove when so inserted.

6. The actuator of claim 1 further including:
   a tab means formed in the flexible printed circuit at a proximate end thereof, bendable relative to a remainder of the flexible printed circuit to facilitate a co-planar attachment of the tab means to the circuit package while the major plane of the flexible circuit is parallel to said predetermined plane.

7. The actuator of claim 1 further including:
   a groove formed along one side of the transducer suspension structure, for receiving at least an edge portion of the flexible printed circuit.

8. The actuator of claim 1 wherein:
   said transducer support assembly includes a plurality of elongate transducer suspension structure, spaced apart from one another in a direction perpendicular to the predetermined plane and arranged in a stack;
   said flexible circuitry includes a plurality of the elongate and substantially planar flexible printed circuits, each of the flexible circuits being associated with a different one of the transducer suspension structure and coupled to a data transducing head supported at the free end region of the associated transducer suspension structure; and
   said exterior surface of the electrical circuit package is planar, perpendicular to the predetermined plane, and spans the entire stack of the transducer suspension means whereby said connecting structure forms respective mechanical and electrical couplings of the flexible circuits with said circuit package, with respective major planes of the flexible circuits being parallel to one another and to the predetermined plane.

9. The actuator of claim 8 wherein:
   said connecting structure comprises a plurality of slots in the circuit package, for accommodating edgewise insertions of the flexible printed circuits and for supporting the flexible printed circuits.

10. The actuator of claim 9 wherein:
    at least selected ones of the transducer suspension structures support a pair of said data transducing heads, a pair of the flexible printed circuits is disposed along each of the selected transducer suspension structures, with each circuit coupled to an associated one of the pair of data transducing heads, and each of the sloes is associated with a different one of the transducer suspension structures, to accommodate the edgewise insertion of and to frictionally support a pair of the flexible printed circuits in side-by-side relation.

11. The actuator of claim 8 wherein:
said connecting structure includes a plurality of support features positioned selectively relative to the circuit package and defining grooves adapted to accommodate an edgewise insertion and nesting engagement of the flexible printed circuits.

12. The actuator of claim 8 further including:
a tab means at a proximate end of each of the flexible printed circuits, bendable to form a co-planar engagement with said exterior surface of the circuit package, with the major plane of the flexible printed circuit maintained parallel to the predetermined plane.

13. The actuator of claim 1, in combination with a disk drive that includes a disk-shaped data storage medium mounted for rotation relative to the stationary disk drive frame about an axis perpendicular to the predetermined plane, wherein said movement of the carriage selectively positions the data transducing head relative to the data storage medium.

14. The actuator of claim 1 wherein:
said exterior surface of the electrical circuit package is offset angularly with respect to the predetermined plane.

15. The actuator of claim 1 wherein:
said substantially planar flexible printed circuit extends to the transducing head for an electrical coupling with the transducing head.

16. In a disk drive including a plurality of disk-shaped data storage media rotatable about a common axis, a carriage movable in a predetermined plane relative to the media, and a substantially rigid electrical circuit package integral with the carriage and proximate the carriage; a suspension for supporting a plurality of data transducing heads with respect to the carriage for selected positioning relative to the storage media, said suspension including:
a substantially planar and rigid support arm integral with the carriage and extending from the carriage in a first direction substantially parallel to a predetermined plane, and oriented with its major plane substantially parallel to the predetermined plane;
first and second load arms mounted to the support arm and extending from the support arm in cantilever fashion generally in a first direction;
a first data transducing head mounted to a free end region of the first load arm, and a second data transducing head mounted to the free end region of the second load arm, said load arms being adapted to bias the transducing heads in a second direction perpendicular to the predetermined plane;
first and second elongate, substantially planar, thin and flexible electrical printed circuits, electrically and mechanically coupled at respective proximate, ends thereof to a substantially rigid electrical circuit package supported by the carriage, said flexible circuits extending lengthwise in the first direction and having respective remote ends thereof disposed near the first and second data transducing heads, respectively, said first and second flexible circuits having selected orientations such that their major planes are substantially parallel to the predetermined plane;
wherein each of said circuits has mutually perpendicular length, width and thickness dimensions, the thickness dimension is perpendicular to the predetermined plane, and the length dimension and width dimension are larger than the thickness dimension by at least a factor of ten;
a connecting structure integral with the circuit package, adapted to form mechanical and electrical couplings of the first and second flexible circuits with the circuit package while maintaining the flexible circuits in respective selected orientations in which respective major planes of the flexible circuits are parallel to the predetermined plane; and
first and second stiffening means incorporated within the first and second flexible circuits, respectably, to enhance resistance to bending about axes perpendicular to the predetermined plane.

17. The suspension of claim 16 wherein:
said first and second data transducing heads are moved in arcuate paths due to rotation of the carriage about an axis perpendicular to the predetermined plane.

18. The suspension of claim 16 wherein:
the connecting structure comprises a slot in the rigid circuit package, adapted to accommodate an edgewise insertion of the first and second flexible circuits when the flexible circuits are in side-by-side relation, and to retain the flexible circuits in said relation.

19. The suspension of claim 16 wherein:
said connecting structure includes a support feature positioned selectively relative to the circuit package and defining a groove adapted to accommodate an edgewise insertion of the first and second flexible circuits, when side-by-side, into a nesting engagement within the groove.

20. The suspension of claim 16 further including:
first and second tab means formed in the first and second flexible circuits respectively, each of the tab means being bendable to facilitate a co-planar surface engagement with an exterior surface of the circuit package while a remainder of the associated flexible circuit package is maintained in its selected orientation.

21. The suspension of claim 16 further including:
a groove formed along one side of the support arm, for accommodating at least respective edge regions of the first and second flexible circuit packages.

22. The suspension of claim 16 wherein:
said first and second flexible electrical printed circuits are electrically coupled at their remote ends to the first and second data transducing heads, respectively.

23. In a disk drive including a plurality of disk-shaped data storage media rotatable about a common axis, a carriage movable in a predetermined plane relative to the media, and a substantially rigid electrical circuit package integral with the carriage and proximate the carriage; a suspension for supporting a plurality of data transducing heads with respect to the carriage for selected positioning relative to the storage media, said suspension including:
a substantially planar and rigid support arm integral with the carriage and extending from the carriage in a first direction substantially parallel to a predetermined plane, and oriented with its major plane substantially parallel to the predetermined plane;
first and second load arms mounted to the support arm and extending from the support arm in cantilever fashion generally in the first direction;
a first data transducing head mounted to a free end region of the first load arm, and a second data transducing head mounted to the free end region of the second load arm, said load arms being adapted to bias the transducing heads in a second direction perpendicular to the predetermined plane;

first and second elongate, substantially planar thin and flexible electrical printed circuits, electrically and mechanically coupled at respective proximate ends thereof to a substantially rigid electrical circuit package supported by the carriage, said flexible circuits extending lengthwise in the first direction and having respective remote ends thereof disposed near the first and second data transducing heads, respectively, said first and second flexible circuits having selected orientations such that their major planes are substantially parallel to the predetermined plane; and a connecting structure integral with the circuit package, adapted to form mechanical and electrical couplings of the first and second flexible circuits with the circuit package while maintaining the flexible circuits in respective selected orientations in which respective major planes of the flexible circuits are parallel to the predetermined plane, said connecting structure comprising a slot in the rigid circuit package adapted to accommodate an edgewise insertion of the first and second flexible circuits when the flexible circuits are in side-by-side relation, and further adapted to retain the flexible circuits in said side-by-side relation.

24. The suspension of claim 23 further including:

first and second stiffening means incorporated within the first and second flexible circuits, respectively, to enhance resistance to bending about axes perpendicular to the predetermined plane.

* * * * *